March 9, 1965 D. B. SMITH 3,172,682
CARRIAGE HANDLE ADJUSTMENT LINKAGE
Filed July 29, 1963 2 Sheets-Sheet 1

INVENTOR.
DONALD B. SMITH
BY
Russell, Chittick + Pfund
ATTORNEYS

March 9, 1965   D. B. SMITH   3,172,682
CARRIAGE HANDLE ADJUSTMENT LINKAGE
Filed July 29, 1963   2 Sheets-Sheet 2

INVENTOR.
DONALD B. SMITH
BY
Russell, Chittick & Pfund.
ATTORNEYS

United States Patent Office 3,172,682
Patented Mar. 9, 1965

3,172,682
CARRIAGE HANDLE ADJUSTMENT LINKAGE
Donald B. Smith, Orillia, Ontario, Canada, assignor to Heywood-Wakefield Company of Canada, Limited, Orillia, Ontario, Canada, a corporation of Canada
Filed July 29, 1963, Ser. No. 298,083
4 Claims. (Cl. 280—47.37)

This invention relates to a linkage arrangement which can be manipulated to change the angular position of a carriage handle and more particularly to a construction of linkage elements which cooperate to angularly position a carriage handle into either an upper or a lower pushing position.

Baby carriages and baby strollers are normally constructed with a frame supported by four wheels and a bed or seat mounted on the frame in which a baby can be carried. Such a vehicle is generally pushed by means of a handle which is attached to the frame and protrudes rearwardly from the vehicle. Inasmuch as people pushing such carriages will be of varying heights, no one handle height can prove universally comfortable to all pushers. For example, a tall woman may prefer a higher handle position than that favored by a shorter woman. A previous common way to provide this adjustability was to fasten the carriage handle to the frame with a pair of transverse bolts and wing nut fasteners so that the handle could be pivoted to the desired height whereupon the wing nuts would be tightened. However, this has proven generally unsatisfactory because after continued use the handle tends to slip. Furthermore, the amount of force required to tightly secure the wing nuts and then to disengage them is too great to be easily done by a woman. Other constructions to solve this problem have likewise not proved consistently satisfactory.

Accordingly, it is an object of this invention to provide a linkage arrangement having few moving parts which is quick and easy to operate, yet has great rigidity once in position.

Another object of this invention is to provide a linkage arrangement which, once the handle is locked into pushing position, holds it securely in position from where it can not be accidentally dislodged.

A further object of this invention is to provide a linkage arrangement that can be easily operated by a woman to position a carriage handle in either of two pushing positions.

A still further object of this invention is to provide a carriage handle linkage arrangement which is inexpensive and simple to fabricate and can be adapted to be used on a wide variety of wheeled baby conveyances.

Other objects and advantages of the invention will become apparent from the study of the accompanying drawings and descriptive matter in which is illustrated and described a preferred embodiment of the invention.

Figure 1:
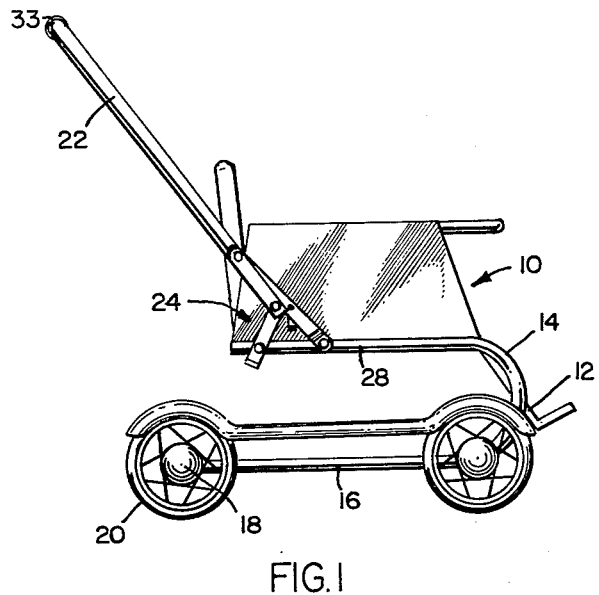
FIG. 1 is an elevational view of a baby stroller showing the right-hand linkage arrangement in the lower pushing position.

Referring now more particularly to the drawings, the baby stroller illustrated in FIG. 1 will be recognized as being conventional in several respects. The stroller has a seat generally designated as 10 with foot rest 12 supported by a tubular suspension frame 14 which is curved in cantilever fashion, the bottom portion of which is designated as base frame 16. A pair of transverse axles 18 are carried by base frame 16 and carriage wheels 20 are rotatably mounted on the axles. A rearwardly disposed carriage handle 22 is attached to suspension frame 14 so as to provide a means by which the stroller can be pushed along a pathway. The baby stroller as just described is conventional and well-known and, accordingly, it is not necessary here to set forth this construction in detail as it does not form a part of the present invention.

Referring again to FIG. 1, only the right hand linkage arrangement designated generally as 24 by which carriage handle 22 is pivotally connected to the tubular suspension frame 14 is shown in an elevational view. It will be obvious to persons familiar with the art that any differences in structure between the two linkage arrangements are a result only of the fact that one of the linkages is adapted to support the right-hand side of carriage handle 22 and the other linkage is adapted to support the left-hand side of the handle. For simplicity, only one of the linkage arrangements will be described in detail.

The linkage arrangement 24 is preferably composed of a rear pivot link 26 rotatably connected to upper rail 28 of suspension frame 14 by pivot pin 30. Likewise rotatably connected to upper rail 28 at a point forwardly spaced from pivot pin 30 is front pivot link 32 which rotates about pivot pin 34. It is important to note that the front pivot link 32 is longer than rear pivot link 26, preferably in the ratio of approximately 8 to 5.

Carriage handle 22 is a generally U-shaped handle having a gripping surface 33 for the pusher's hands. The handle opens downwardly and terminates in lower end portions 35 only one of which will be described. Lower end portion 35 is preferably laterally flattened and is pivotally attached to the upper end of rear pivot link 26 by pin 36. Coaxially mounted about pin 36 is a cylindrical spacer 38 which acts to separate lower end portion 35 from rear pivot link 26 and also acts as a bearing surface for a purpose which will be described later. Front pivot link 32 is pivotally attached to lower end portion 35 at a point above pin 36 by means of pin 42.

Figure 3:
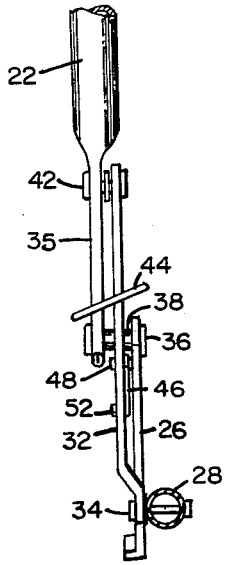
FIG. 3 is a view of the right-hand linkage shown in FIGS. 1 and 2, taken from the front of the stroller looking rearwardly.
Figure 4:
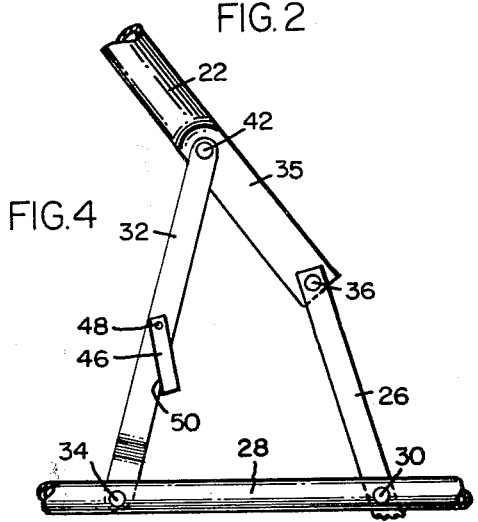
FIG. 4 is a view of the right-hand linkage shown in FIG. 2 illustrating the position of the linkage after it has been pivoted preparatory to changing the carriage handle position.

Looking now at FIG. 4, it can be seen that the linkage arrangement 24 is comprised of the fixed upper rail 28, two pivot links 26 and 32 of unequal lengths and a pivoting lower end portion 35 of carriage handle 22. This linkage arrangement is adapted to pivot from the position shown in FIG. 4 to the lower pushing position shown in FIGS. 1–3 wherein the front pivot link 32 bears against cylindrical spacer 38. In this position the carriage handle 22 is angled rearwardly from the vertical approximately 35 degrees.

To lock the linkage arrangement 24 in the lower pushing position, a metal ring 44, coaxially slidably on carriage handle 22 is moved as far down as possible on lower end portion 35 and front pivot link 32 thereby securing those two members in substantially parallel alignment so that when the carriage handle 22 is pushed forwardly the linkage will not unlock.

Figure 5:
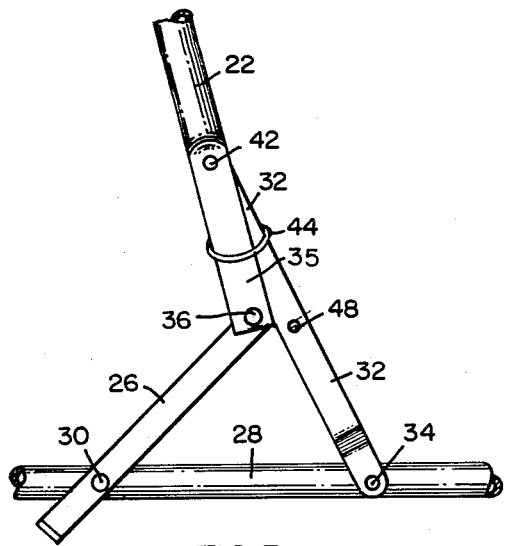
FIG. 5 is an elevational view of the linkage arrangement in the upper pushing position.
Figure 6:
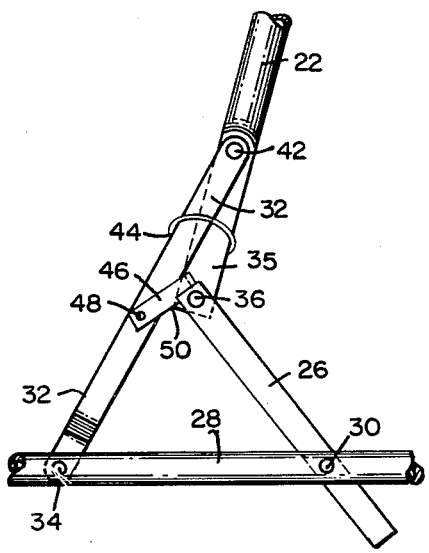
FIG. 6 is a view of the right-hand linkage shown in FIG. 5, taken from the interior of the stroller looking outwardly.

To provide a higher or upper pushing position for the carriage handle 22, an L-shaped finger 46 is pivotally connected to front pivot link 32 by pin 48. When the linkage arrangement is unlocked and moved into the position shown in FIG. 4, finger 46 is rotatable from a downwardly hanging non-operative station shown in FIGS. 1–4 to an operating station shown in FIGS. 5 and 6 wherein its lateral edge 50 is brought into abutting relationship with spacer 38 as shown in FIG. 6. When the lower end portion 35 of carriage handle 22 is then pivoted rearwardly, front pivot link 32 is rotated against the inwardly turned tip portion 52 of finger 46 and is thereby held at an angle closer to the vertical than is the case in the lower pushing position. As a result, the carriage handle 22 is held in the more upright upper pushing position of approximately 25 degrees rearward from the vertical as shown in FIG. 5. The linkage arrangement can then be locked by the deployment of ring 44 which is pushed downwardly to encompass lower end portion 35 and front pivot link 32.

It can therefore be seen that the linkage arrangement 24 is adapted to shift the carriage handle 22 into either of two positions, an upper pushing position or a lower pushing position, the single determining factor being whether the L-shaped finger 46 is manually rotated against the cylindrical spacer 38 or not.

Figure 2:
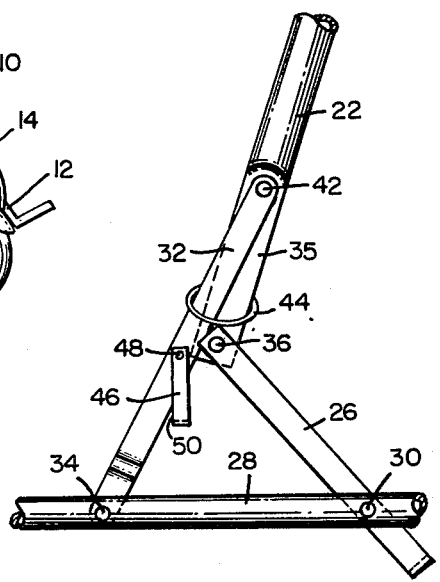
FIG. 2 is a view of the right-hand linkage shown in FIG. 1, also in the lower pushing position, the view being taken from the interior of the stroller looking outwardly.

In operation, FIGS. 1–3 illustrate the lower pushing position wherein the L-shaped finger 46 is in its downwardly disposed non-operative station and wherein front pivot link 32 bears against spacer 38 to hold carriage handle 22 at an angle of approximately 35 degrees from the vertical. To move the carriage handle to the upper pushing position shown in FIGS. 5–6, ring 44 is first raised upwardly so as not to interfere with the pivoting linkage action. Carriage handle 22 is then tipped forwardly which pivots the linkage to the position shown in FIG. 4. This motion disengages the front pivot link 32 from cylindrical spacer 38. L-shaped finger 46 is then rotated upwardly and carriage handle 22 is moved rearwardly so as to position finger 46 above and against spacer 38. As carriage handle 22 is pushed further toward the rear of the baby stroller, front pivot link 32 is pivoted downwardly to bear against the tip portion 52 of L-shaped finger 46, thereby causing front pivot link 32 to be braced at an angle closer to the vertical than is the case when it bears against cylindrical spacer 38 in the lower pushing position. Ring 44 is then lowered over front pivot link 32 and lower end portion 35 to lock the linkage arrangement in the upper pushing position as shown in FIGS. 5–6. This procedure is simply reversed to reorient the carriage handle into the lower pushing position wherein the finger 46 is rotated downwardly into its non-operative position.

Obviously, many modifications and variations of the invention are possible in light of the above teachings. Therefore, it is to be understood that the invention is not limited in its application to the details of the construction and arrangement of parts specifically described or illustrated, and that within the scope of the appended claims, it may be practiced otherwise than as specifically described or illustrated.

I claim:
1. In a baby carriage, a linkage arrangement for adjusting the angular position of the carriage handle, said linkage arrangement comprising; a base; front and rear links spaced apart and pivotally connected to said base; a carriage handle pivotally connected to said rear link by means including a transverse support pin, said carriage handle pivotally connected to said front link at a point on said handle above said support pin whereby said carriage handle is pivotable to a first position wherein said front link bears against said support pin; and an L-shaped finger pivotally connected to said front link and movable to a position adjacent to said front link in the path of said support pin, whereby said finger prevents said carriage handle from arriving at said first position and thereby holds it in a more erect second position.

2. An apparatus as described in claim 1 wherein a ring is co-axially carried on said carriage handle and movable over the lower end of said handle and said front link to immobilize the linkage arrangement and lock the carriage handle in angular position.

3. In a baby carriage, a linkage arrangement for adjusting the angular position of the carriage handle comprising, parallel base rails extending along the sides of said carriage; two pairs of front and rear links, each pair spaced apart and pivotally connected to one of said base rails, said front link being longer than said rear link; a generally U-shaped carriage handle opening downwardly and having support pins transversely mounted in the lower ends thereof, said carriage handle pivotally connected to said rear links by means of said transverse support pins, said carriage handle also pivotally connected to said front links at a point spaced above said lower handle ends whereby the carriage handle pivots into a first angular position wherein said front links bear against the transverse support pins; and a pair of L-shaped fingers, each finger pivotally connected to a front link, said fingers being rotatable against said transverse support pins whereby the carriage handle pivots into a second angular position wherein said front links bear against said L-shaped fingers.

4. A linkage arrangement as described in claim 3 wherein a pair of rings are coaxially carried by said carriage handle and are movable over the lower handle ends and the front links whereby said linkage arrangement is immobilized and said carriage handle is angularly locked in position.

References Cited by the Examiner
UNITED STATES PATENTS

| 2,972,488 | 2/61 | Alsop | 280—47.37 |
| 3,029,087 | 4/62 | Alsop | 280—47.37 |

FOREIGN PATENTS

| 746,265 | 3/56 | Great Britain. |

A. HARRY LEVY, *Primary Examiner.*
PHILLIP ARNOLD, *Examiner.*